(12) United States Patent
Whitford et al.

(10) Patent No.: US 11,353,079 B2
(45) Date of Patent: Jun. 7, 2022

(54) SPRING ASSEMBLIES, APPLICATIONS OF SPRING ASSEMBLIES, AND RELATED METHODS

(71) Applicant: Bal Seal Engineering, LLC, Foothill Ranch, CA (US)

(72) Inventors: Patrick Whitford, Costa Mesa, CA (US); Farshid Dilmaghanian, Rancho Santa Margarita, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 437 days.

(21) Appl. No.: 16/150,117

(22) Filed: Oct. 2, 2018

(65) Prior Publication Data

US 2019/0107166 A1    Apr. 11, 2019

Related U.S. Application Data (60) Provisional application No. 62/568,524, filed on Oct. 5, 2017.

(51) Int. Cl.
| | |
|---|---|
| *F16J 15/24* | (2006.01) |
| *F16F 3/04* | (2006.01) |
| *F16J 15/3212* | (2016.01) |
| *F16F 3/02* | (2006.01) |
| *F16F 1/04* | (2006.01) |
| *F16F 3/06* | (2006.01) |

(52) U.S. Cl.
CPC ............ *F16F 3/04* (2013.01); *F16F 1/045* (2013.01); *F16F 3/02* (2013.01); *F16F 3/06* (2013.01); *F16J 15/3212* (2013.01); *F16F 2224/0208* (2013.01)

(58) Field of Classification Search
CPC .. F16F 1/043; F16F 1/045; F16F 1/046; F16F 3/02; F16F 3/04; H01R 13/03; F16J 15/24
USPC ............................. 267/1.5, 166.1, 167, 168
See application file for complete search history.

(56) References Cited

U.S. PATENT DOCUMENTS

| | | | |
|---|---|---|---|
| 4,655,462 A | 4/1987 | Balsells |
| 4,655,945 A | 4/1987 | Balsells |
| 4,804,290 A | 2/1989 | Balsells |
| 4,805,943 A | 2/1989 | Balsells |
| 4,826,144 A | 5/1989 | Balsells |
| 4,830,344 A | 5/1989 | Balsells |
| 4,876,781 A | 10/1989 | Balsells |
| 4,893,795 A | 1/1990 | Balsells |

(Continued)

OTHER PUBLICATIONS

Extended European Search Report from European Patent Office on co-pending EP application (EP 18198672.0) dated Feb. 26, 2019.

*Primary Examiner* — Christopher P Schwartz
(74) *Attorney, Agent, or Firm* — Klein, O'Neill & Singh, LLP (57) ABSTRACT

A spring assembly with two or more springs, one inside another. The spring assembly can have two springs wherein one spring is located inside another spring, and the outer spring can be a helical ribbon spring and the inner spring can be a canted coil spring to provide support to the outer helical ribbon spring. Support is provided where the helical ribbon spring may have some limitations that the inner spring is able to overcome. Limitations of the helical ribbon spring may be a limited force versus deflection curve which the additional spring support of the secondary spring may overcome.

20 Claims, 7 Drawing Sheets

(56) References Cited

U.S. PATENT DOCUMENTS

| | | | |
|---|---|---|---|
| 4,907,788 A * | 3/1990 | Balsells | F16F 1/04 |
| | | | 267/1.5 |
| 4,915,366 A | 4/1990 | Balsells | |
| 4,934,666 A * | 6/1990 | Balsells | F16F 1/045 |
| | | | 267/1.5 |
| 4,961,253 A | 10/1990 | Balsells | |
| 4,964,204 A | 10/1990 | Balsells | |
| 4,974,821 A | 12/1990 | Balsells | |
| 5,072,070 A | 12/1991 | Balsells | |
| 5,079,388 A | 1/1992 | Balsells | |
| 5,091,606 A | 2/1992 | Balsells | |
| 5,108,078 A | 4/1992 | Balsells | |
| 5,117,066 A | 5/1992 | Balsells | |
| 5,134,244 A | 7/1992 | Balsells | |
| 5,139,243 A | 8/1992 | Balsells | |
| 5,139,276 A | 8/1992 | Balsells | |
| 5,149,642 A | 9/1992 | Mazur et al. | |
| 5,160,122 A | 11/1992 | Balsells | |
| 5,161,806 A | 11/1992 | Balsells | |
| 5,203,849 A | 4/1993 | Balsells | |
| 5,239,737 A | 8/1993 | Balsells | |
| 5,265,890 A | 11/1993 | Balsells | |
| 5,358,224 A | 10/1994 | Balsells | |
| 5,425,531 A * | 6/1995 | Perrault | F16F 1/046 |
| | | | 267/166.1 |
| 5,474,309 A | 12/1995 | Balsells | |
| 5,503,375 A | 4/1996 | Balsells | |
| 5,575,487 A | 11/1996 | Balsells | |
| 5,599,027 A | 2/1997 | Balsells | |
| 5,709,371 A | 1/1998 | Balsells | |
| 5,791,638 A | 8/1998 | Balsells | |
| 5,979,904 A | 11/1999 | Balsells | |
| 5,984,316 A | 11/1999 | Balsells | |
| 5,992,856 A | 11/1999 | Basells et al. | |
| 6,050,572 A | 4/2000 | Balsells et al. | |
| 6,161,838 A | 12/2000 | Balsells | |
| 6,193,225 B1 * | 2/2001 | Watanabe | F16F 1/043 |
| | | | 267/167 |
| 6,264,205 B1 | 7/2001 | Balsells | |
| 6,641,141 B2 | 11/2003 | Schroeder | |
| 7,055,812 B2 | 6/2006 | Balsells | |
| 7,210,398 B2 | 5/2007 | Balsells | |
| 7,464,750 B2 | 12/2008 | Schapel et al. | |
| 7,985,105 B2 | 7/2011 | Balsells | |
| 8,096,559 B2 | 1/2012 | Cook | |
| 8,328,202 B2 | 12/2012 | Foster et al. | |
| 8,336,864 B2 | 12/2012 | Noh | |
| 8,544,850 B2 | 10/2013 | Balsells et al. | |
| 8,590,867 B2 | 11/2013 | Leon | |
| 8,684,362 B2 | 4/2014 | Balsells et al. | |
| 9,194,497 B2 | 11/2015 | Rastegar | |
| 9,234,591 B2 | 1/2016 | Dilmaghanian et al. | |
| 9,273,742 B2 | 3/2016 | Balsells et al. | |
| 9,285,034 B2 | 3/2016 | Balsells et al. | |
| 9,293,849 B2 * | 3/2016 | Balsells | H01R 13/03 |
| 9,357,684 B2 | 5/2016 | Foster | |
| 9,518,626 B2 | 12/2016 | Balsells et al. | |
| 2010/0237565 A1 | 9/2010 | Foster | |
| 2010/0289198 A1 | 11/2010 | Balsells et al. | |
| 2011/0006486 A1 | 1/2011 | Niknezhad | |
| 2013/0043661 A1 | 2/2013 | Binder et al. | |
| 2014/0079476 A1 * | 3/2014 | Dilmaghanian | B23K 11/115 |
| | | | 403/328 |
| 2014/0259617 A1 | 9/2014 | Kompa et al. | |
| 2014/0312570 A1 | 10/2014 | Foster | |
| 2015/0240900 A1 | 8/2015 | Poon et al. | |
| 2015/0316115 A1 | 11/2015 | Carter | |
| 2016/0047473 A1 | 2/2016 | Foster et al. | |
| 2016/0076568 A1 * | 3/2016 | Dilmaghanian | H01R 13/514 |
| | | | 403/271 |
| 2016/0223086 A1 | 8/2016 | Balsells et al. | |
| 2017/0172018 A1 | 6/2017 | Dilmaghanian et al. | |
| 2017/0261108 A1 | 9/2017 | Soler et al. | |
| 2017/0328474 A1 | 11/2017 | Balsells | |
| 2018/0112778 A1 | 4/2018 | Dilmaghanian et al. | |
| 2018/0119857 A1 | 5/2018 | Balsells | |
| 2018/0266562 A1 | 9/2018 | Balsells | |

* cited by examiner

SPRING ASSEMBLIES, APPLICATIONS OF SPRING ASSEMBLIES, AND RELATED METHODS

FIELD OF THE INVENTION

The invention pertains to spring assemblies, canted coil springs, V-springs, and helical ribbon spring assemblies with added spring support, among others.

BACKGROUND

Canted coil springs offer a variety of benefits over helical ribbon springs. A canted coil spring (CCS) exhibits a unique characteristic of a relatively flat force versus deflection relationship that can be used with, for example, a seal element to maintain a relatively constant load on the seal lips over a range of deflection to compensate for tolerance issues thereby can extend seal life. A CCS may have high force, yet recover from large deflections without damaging, such as permanent deformation. A downside to the canted coil spring in certain applications, such as when operating as an energizer for a seal element, is the way force is distributed around a circumference of a seal due to the spacing between adjacent coils that form the CCS. The force applied by the canted coil spring has a contact surface area that is limited to the wire diameter used to make the canted coil spring, which bears against the seal when used in a seal application.

A helical ribbon spring is coiled with a metal element that has a generally flat surface, like a ribbon. Relative to a canted coil spring, a helical ribbon spring has a steep and linear force versus deflection curve, and a much lower maximum deflection amount before permanent deformation. Furthermore, the steep force versus deflection curve of a typical canted coil spring may be detrimental in certain applications, such as seal performance. However, the helical ribbon spring provides a greater contact surface area against the seal element in a seal energizer application. The increased contact surface area may be more ideal than the canted coil spring due to a more uniform force against a seal.

SUMMARY

Aspects of the present invention provide a helical ribbon spring with an additional canted coil spring support wherein the force versus deflection characteristics of a canted coil spring may be applied towards the helical ribbon spring.

Aspects of the present invention further include a spring assembly having two or more coiled bodies and wherein the force deflection characteristics of the spring assembly differs from the individual force deflection characteristics of the two or more individual coiled bodies.

A further aspect of the present disclosure includes a spring assembly comprising two springs, including an outer spring and an inner spring, wherein the inner spring is located inside the outer spring, the outer spring is a helical ribbon spring, and the inner spring provides support to the helical ribbon spring. In an example, the inner spring can be a canted coil spring, can be a second helical ribbon spring, can be both an inner helical ribbon spring and a CCS.

In a still further aspect of the invention, support is provided in a spring assembly wherein a helical ribbon spring may have some limitations that an inner spring is able to overcome. In an example, the limitations of the helical ribbon spring include a limited force versus deflection curve which the additional inner spring support may overcome by modifying or supplementing the force versus deflection curve of the helical ribbon spring with a different force versus deflection curve of the inner spring.

Aspects of the present invention further comprises a spring assembly comprising: an inner spring located inside an outer spring, a helical ribbon spring as the outer spring, said outer spring comprising a plurality of interconnected coils; wherein said outer spring comprises an outer cross-sectional profile; wherein said inner spring comprises an inner cross-sectional profile; wherein said inner cross-sectional profile is located within said outer cross-sectional profile and biased against interior surfaces of the plurality of interconnected coils; and wherein the outer spring have two ends that are joined to form a spring ring, the inner spring have two ends that are joined to form a spring ring, or both the outer spring have two ends that are joined to form a spring ring and the inner spring have two ends that are joined to form a spring ring.

The ribbon spring or outer spring can have a plurality of ribbon coils and an interior space inside the coils. Said differently, each of the coils has an exterior surface and an interior surface defining an interior space. The interior spaces of the plurality of ribbon coils define an interior space of the ribbon spring. When a secondary spring or inner is positioned inside the interior space of the ribbon spring, the secondary spring can contact and resiliently biases against the interior surfaces of the ribbon coils.

The outer spring can comprise a length and the inner spring can comprise a length and wherein said length of said inner spring can be equal to or less than said length of said outer spring.

The outer spring can comprise a length and said inner spring can comprise a length and wherein said length of said outer spring can be equal to or less than said length of said inner spring.

The inner spring can be a canted coil spring comprising a plurality of interconnected coils all canted in a same direction, and wherein each of the plurality of interconnected coils of the inner spring can comprise a cross-sectional profile comprising a cross-sectional height dimension and a cross-sectional width dimension.

The inner spring can comprise a canted coil spring having a plurality of interconnected coils all canted generally in the same direction. Each coil can have an elliptical shape or a complex shaped coil as shown herein. In some examples, the inner spring can be an inner resiliently biasing O-ring or an elastomer-filled element that has its own biasing characteristics and that modifies the force versus deflection characteristics of the outer ribbon spring.

The outer spring can be a ribbon spring comprising a plurality of interconnected coils. The coils of the ribbon spring, which can be coiled using a metal ribbon strip, can have a round shape, an oval shape, a square shape, a rectangular shape, or a triangle shape.

Each of said plurality of interconnected coils of said outer spring can comprise a cross-sectional height dimension, and wherein said cross-sectional height dimension of said inner spring can be larger than said cross-sectional height dimension of said outer spring.

Each of the plurality of interconnected coils of the outer spring can comprise a cross-sectional width dimension and wherein said cross-sectional width dimension of said inner spring can be larger than said cross-sectional width dimension of said outer spring.

The inner cross-sectional profile of the inner spring can be smaller than the outer cross-sectional profile of the outer spring.

The inner cross-sectional profile of the inner spring can be deflectable so that the cross-sectional height dimension or the cross-sectional width dimension of the inner spring reduces in dimension.

Once the inner cross-sectional profile is reduced by deflection, the inner spring can be fitted into the interior of the outer spring.

The coils of the inner spring can bias against the interior surface of the coils of the outer spring. In an example, the plurality of interconnected coils bias against the interior surface of the plurality of ribbon coils of the outer spring.

Each of the plurality of interconnected coils of the outer spring can comprise a cross-sectional profile comprising a cross-sectional height dimension and a cross-sectional width dimension and wherein the cross-sectional width dimension can be smaller than the cross-sectional width dimension of each of the plurality of coils of the inner spring prior to being compressed and larger than the cross-sectional width dimension of each of the plurality of coils of the inner spring after being compressed.

Each of the plurality of interconnected coils of the outer spring can comprise a cross-sectional profile comprising a cross-sectional height dimension and a cross-sectional width dimension and wherein the cross-sectional height dimension can be smaller than the cross-sectional height dimension of each of the plurality of coils of the inner spring prior to being compressed and larger than the cross-sectional height dimension of each of the plurality of coils of the inner spring after being compressed.

The outer spring can be made of a material different from a material used to form said inner spring. For example, the inner and outer springs can be made from different metallic materials or different alloys.

The inner spring can be a cantilever spring comprising a plurality of interconnected V-bodies, and wherein each V-body has two legs connected to one another at an apex.

The cross-sectional profile of the inner spring can have a complex shape, such as a star shape.

The outer cross-sectional profile of the outer spring can have an oval shape.

The outer cross-sectional profile of the outer spring can have a rectangular shape.

The outer cross-sectional profile of the outer spring can have a square shape.

The outer cross-sectional profile of the outer spring can have a triangular shape.

The inner spring can be a first inner spring and the spring assembly can further comprise a second inner spring having a second inner spring cross-sectional profile, and wherein the second inner spring cross-sectional profile can be located within the inner cross-sectional profile of the first inner spring.

The spring assembly can be placed inside a seal element, the seal element can comprise an inside flange, and outside flange, a center channel section located between the inside flange and the outside flange, which together define a spring cavity, and wherein the outer spring, with the inner spring located therein, can be located in the spring cavity and biasing the inner flange and the outer flange away from one another.

The spring assembly can be mounted around a shaft.

The spring assembly can be located inside a seal element and the seal element located around a shaft.

A further aspect of the invention includes a spring assembly comprising an inner spring located inside an outer spring; a helical ribbon spring as the outer spring, said outer spring comprising a plurality of interconnected coils; wherein said outer spring comprises an outer cross-sectional profile; wherein said inner spring comprises an inner cross-sectional profile; wherein said inner cross-sectional profile is located within said outer cross-sectional profile; and wherein the outer spring has two spaced apart ends and the inner spring has two spaced apart ends.

A third spring having a third spring cross-sectional profile can be included, and wherein the third spring cross-sectional profile can be located within the inner cross-sectional profile.

Aspects of the present invention further include a method of using a spring assembly comprising obtaining a spring comprising inner spring located inside an outer spring, said outer spring being a ribbon spring comprising plurality of interconnected coils; wherein said outer spring comprises an outer cross-sectional profile; wherein said inner spring comprises an inner cross-sectional profile; wherein said inner cross-sectional profile is located within said outer cross-sectional profile and biased against interior surfaces of the plurality of interconnected coils; and wherein the outer spring have two ends that are joined to form a spring ring, the inner spring have two ends that are joined to form a spring ring, or both the outer spring have two ends that are joined to form a spring ring and the inner spring have two ends that are joined to form a spring ring; and placing the spring into or onto a component.

An aspect of the present invention includes a method for forming a spring assembly, said method comprising forming an outer spring with an outer spring cross-sectional profile with an interior space, forming an inner spring with an inner spring cross-sectional profile, and placing the inner spring with the inner spring cross-sectional profile in the interior space of the outer spring cross-sectional profile, and wherein the outer spring is a helical ribbon spring having a plurality of interconnected ribbon coils.

The inner spring is positioned inside the outer spring such that the inner spring biases against the interior surfaces of the coils of the outer spring.

The inner spring can be any of the springs described elsewhere herein, including a canted coil spring, a V-spring, an O-ring, or an elastomeric filled component. The canted coil spring can have a plurality of coils that cant in the same direction with each coil having an elliptical shape or one of the complex coils shapes shown and described herein.

The component can be a seal element comprising an inside flange, an outside flange, and a center channel section located between the inside flange and the outside flange or a shaft that is rotatable or reciprocal.

Methods of making and of using spring assemblies, applications of spring assemblies, and components thereof are within the scope of the present invention.

BRIEF DESCRIPTION OF THE DRAWINGS

FIGS. 5A1 and 5A2 show cross-sectional views of both a canted coil spring and a helical ribbon spring, respectively, or a side view of a coil of a canted coil spring and a coil of a helical ribbon spring, respectively. Symbols "A", "B", and "C" are representative dimensions, which can vary in values depending on the application.

FIGS. 5B1 and 5B2 show cross-sectional views of both a canted coil spring and a helical ribbon spring, respectively, or a side view of a coil of a canted coil spring and a coil of a helical ribbon spring, respectively. Symbols "A", "B", and "C" are representative dimensions with FIG. 5B1 including arrows to represent compression direction of the spring.

FIGS. 6A1 and 6A2 show cross-sectional views of both a canted coil spring and a helical ribbon spring, respectively, or a side view of a coil of a canted coil spring and a coil of a helical ribbon spring, respectively. Symbols "A", "B", and "C" are representative dimensions.

FIGS. 7A1 and 7A2 show cross-sectional views of both a canted coil spring and a helical ribbon spring, respectively, or a side view of a coil of a canted coil spring and a coil of a helical ribbon spring, respectively. Symbols "A", "B", and "C" are representative dimensions.

FIGS. 7B1 and 7B2 show cross-sectional views of both a canted coil spring and a helical ribbon spring, respectively, or a side view of a coil of a canted coil spring and a coil of a helical ribbon spring, respectively. Symbols "A", "B", and "C" are representative dimensions with FIG. 7B2 including arrows to represent compression direction of the spring.

DETAILED DESCRIPTION

The detailed description set forth below in connection with the appended drawings is intended as a description of the presently preferred embodiments of spring assemblies, applications of spring assemblies, and components thereof provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1A:
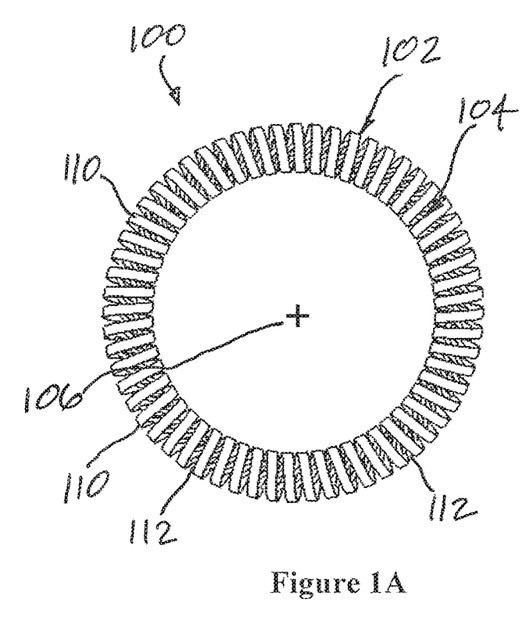
FIGS. 1A-1B show a front view and an isometric view, respectively, of a spring assembly.

FIG. 1A shows a front of a spring assembly 100. In an example, the spring assembly 100 of FIG. 1A comprises a primary spring or outer spring 102 and a secondary spring or inner spring 104, wherein the secondary spring 104 is located inside the primary spring 102. The inner and outer springs can both be in a ring or garter configuration with their respective ends connected, such as by welding the two ends together as described in co-pending U.S. application Ser. No. 16/118,075, entitled Spring Wire Ends to Facilitate Welding, filed Aug. 30, 2018, or by intertwining the two ends together, as described in U.S. Pat. No. 5,709,371. The contents of these references are expressly incorporated herein by reference. Thus, when a spring length with two free ends are connected, the configuration of the spring is understood to be in a ring configuration or a garter shape configuration.

A spring ring with its two ends connected can have a length, which can be considered the length of the outer circumference, the inner circumference, the circumference of the coil axis in the closed configuration, or the axis passing through the center of the coils in the closed configuration, or the length from one free end to another free end if the ring is disconnected at its two free ends.

In an example, the primary spring 102 can be a helical ribbon spring and the secondary spring 104 can be a canted coil spring. Optionally, the term primary spring can be referred to as a first spring or an outer spring and the term secondary spring can be referred to as a second spring or an inner spring.

A ribbon spring 102 can be formed by coiling a metal ribbon into a length comprising a plurality of interconnected ribbon coils 110 having two free ends. The two free ends of the ribbon spring length can then be connected together to form a ribbon spring ring or a garter ribbon spring. The spacing or pitch between two adjacent ribbon coils 110, the ribbon width and thickness, and the coil angle of the helical wound can vary depending on the application. The metal ribbon type, or metal material, can also vary. Additional disclosures regarding a ribbon spring, a V-spring, canted coil springs, and different metals for making the springs can be found in U.S. application Ser. No. 16/118,075, previously incorporated by reference.

The ribbon spring 102 has a plurality of ribbon coils 110 and an interior space inside the coils. Said differently, each of the coils 110 has an exterior surface and an interior surface defining an interior space. The interior spaces of the plurality of ribbon coils define an interior space of the ribbon spring 102. When a secondary spring 104 is positioned inside the interior space of the ribbon spring 102, the secondary spring contacts and resiliently biases against the interior surfaces of the ribbon coils.

As shown in FIG. 1A, the spring assembly 100 has an outer or outside diameter, an inner or inside diameter, and a spring ring centerline 106. The spring ring centerline of the inner spring 104 can be concentric with the outer spring 102.

Figure 1B:
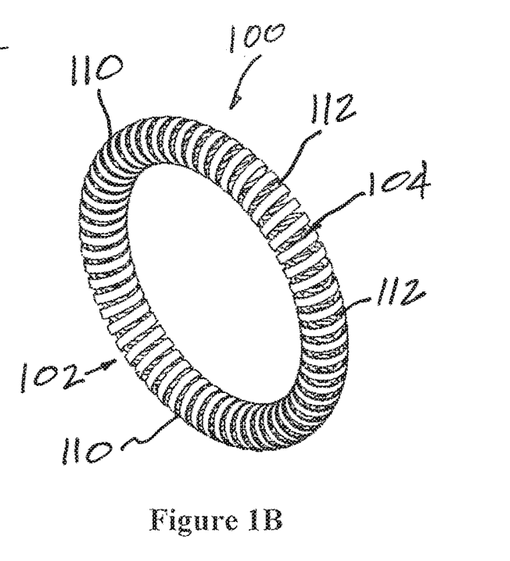

FIG. 1B illustrates an isometric view of the spring assembly 100 of FIG. 1A. As shown, the helical ribbon spring 102, or the primary spring, encapsulates or surrounds the canted coil spring or inner spring 104, which can be seen between the various gaps 112 of the outer ribbon coils 110.

The helical ribbon spring 102 has a plurality of interconnected ribbon coils 110 spaced from one another by a gap 112. The inner canted coil spring 104 can be seen through the gaps 112. The coils of the inner spring or the coils of the canted coil spring can bias against interior surfaces of the ribbon coils from inside the central space or interior space of the ribbon spring 102 to alter the force versus deflection curve of the ribbon spring.

The arrangement with an outer spring and an inner spring can provide the benefit of allowing the greater surface areas of the ribbon coils to contact or bias against the structure that the spring assembly is used, such as against the inner and outer flanges of a seal element, while allowing the force versus deflection characteristics of the inner canted coil spring to provide the beneficial dynamic operating biasing force. The greater surface areas minimize the possibility of the ribbon coils imbedding into the surfaces of the seal element.

A canted coil spring is understood to have a generally constant force versus deflection curve over a range of deflection. This allows the canted coil spring to produce a generally constant spring force even when the canted coil spring is being deflected or canted along a range of deflection.

For example, when a canted coil spring is placed between a shaft and an annular space of a housing and the shaft deflects, the spring force experienced by the shaft and the housing remains generally constant. Canted coil springs with a generally constant force over a range of deflection are described in U.S. Pat. Nos. 4,655,462 and 4,826,14, the contents of which are expressly incorporated herein by reference.

This operating characteristic is preferred in many applications, such as in a spring energized lip seal application, and can be introduced in a ribbon spring to form a spring assembly that has coils with large contact surface areas, as provided by the ribbon coils, and a force versus deflection curve with a preferred generally constant operating range.

Figure 2A:
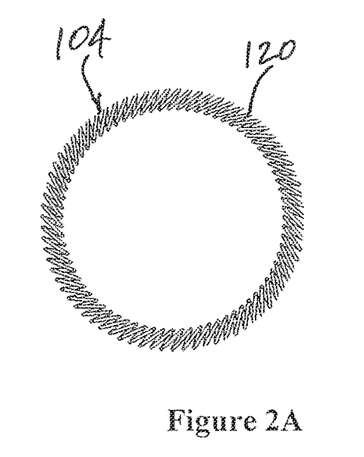
FIG. 2A shows a front of a canted coil spring and FIG. 2B shows a front view of a helical ribbon spring.
Figure 2B:
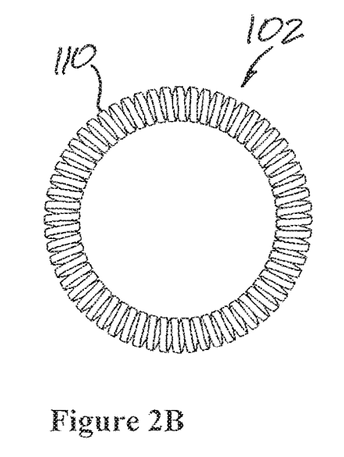

FIG. 2A shows a front view of a canted coil spring 104 and FIG. 2B shows a front view of a helical ribbon spring 102. The two springs 102, 104 can be combined to form the spring assembly 100 of FIGS. 1A and 1B, with the canted coil spring located inside the coils of the helical ribbon spring. The canted coil spring 104 provided herein can comprise a spring body with a plurality of inter-connected coils in a spring ring configuration with a ring center. The ring center defines an axis passing through the ring, which can alternatively be called a ring axis.

Each coil of the plurality of coils of the canted coil spring can be oriented so that the minor axis of the coil, or the shorter of two axes of the elliptical shaped coil, is aligned to be generally parallel to the ring axis and the major axis, or the longer of the two axes, is generally perpendicular to the ring axis. This canted coil spring can be called an axial canted coil spring.

Each coil of the plurality of coils of the canted coil spring can be oriented so that the minor axis of the coil, or the shorter of two axes of the elliptical shaped coil, is aligned to be generally perpendicular to the ring axis and the major axis, or the longer of the two axes, is generally parallel to the ring axis. This canted coil spring can be called a radial canted coil spring.

A common axis passing through the center of each coil may be referred to as a coil axis, which is perpendicular to the ring axis. The coils can all cant generally the same direction, which gives the spring its canting characteristics. A canted coil spring typically deflects when a force is applied along the minor axes of the coils.

Both the canted coil spring 104 and the helical ribbon spring 102 may be similar in size, with approximately the same overall length, same inside spring ring diameter, and same outside ring diameter. However, the two springs 102, 104 can have different sizes and different lengths. Different size springs 102, 104, when the two springs are assembled in a ring configuration as shown in FIGS. 1A and 1B, can cause the coils of the inner canted coil spring 104 to either bias against the interior outer surface or the interior inner surface of the ribbon spring, or both the interior inner surface and the interior outer surface of the ribbon spring.

In other words, the coils 120 of the inner canted coil spring 104 located inside the ribbon coils 110 of the outer helical ribbon spring 102 can be (1) spaced from the interior outer surfaces, relative to the spring ring centerline, of the ribbon coils but contact the interior inner surfaces of the ribbon coils, (2) spaced from the interior inner surfaces of the ribbon coils but contact the interior outer surfaces of the ribbon coils, or (3) contact both the interior outer surfaces and the interior inner surfaces.

For reference purposes, each coil of an outer spring can have an exterior or outside surface and an inside or interior surface. When in a ring configuration, the interior surface of the coil can have an interior outer surface, relative to the ring center, which can be on the side of the ring OD, and an interior inside surface, which can be on the side of the ring ID.

For the spring assemblies 100, applications of spring assemblies, and spring components disclosed herein, which include an outer spring or primary spring and an inner spring or secondary spring, it is understood that where a feature is shown but not expressly described and is otherwise the same or similar to the feature or features described elsewhere, such as above with reference to FIGS. 1A-2B, the disclosed part or parts shown in all the drawing figures but not expressly described because of redundancy and because knowledge is built on a foundation laid by earlier disclosures may nonetheless be understood to be described or taught by the same or similar features expressly set forth in the text for the embodiments in which the feature or features are described. Said differently, subsequent discussions of the present application are built upon the foundation of earlier discussions unless the context indicates otherwise. The application disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following spring assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

Figure 3A:
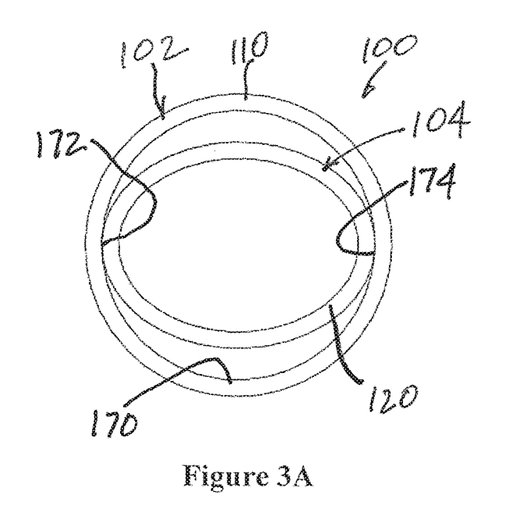
FIGS. 3A-3B show cross-sectional views of two different spring assemblies with two different inner coil orientations.

FIG. 3A illustrates a cross-sectional view of a spring assembly 100 comprising a canted coil spring 104 located inside an outer helical ribbon spring 102, each spring comprising a plurality of coils. However, only a single coil 120 of the canted coil spring 104 is shown located inside a single coil 110 of the helical ribbon spring 102. The spring assembly 100 can be in a spring ring configuration or in a spring length configuration with two free ends of the inner spring 104 and two free ends of the outer spring 102 not connected.

As shown in FIG. 3A, the coil 110 of the outer spring 102 has an inside surface 170 and the width of the coil 120 of the inner canted coil spring 104, or the horizontal axis of two axes of the coil 120, is in contact with the helical ribbon spring at a first inner or interior contact point 172 and at a second inner or interior contact point 174 while the coil 120 of the canted coil spring's height, or the vertical axis of the two axes of the coil 120, is spaced from the inside surface 170 of the coil 110 of the helical ribbon spring 102.

The first inner contact point 172 can alternatively be referred to as an inner outer surface and the second inner contact point 174 can alternatively be referred to as an inner inside surface. The two axes of the coil 120 can alternatively be referred to as a major axis, or the longer of the two axes, and a minor axis, or the shorter of the two axes. These various terms can be used for other similar coils discussed elsewhere herein.

Figure 3B:
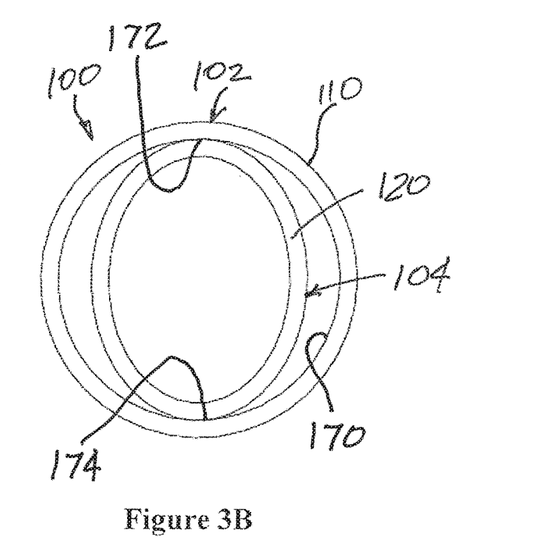

FIG. 3B illustrates a cross-sectional view of a spring assembly 100 comprising a canted coil spring 104 located inside a helical ribbon spring 102, each spring comprising a plurality of coils. However, only a single coil 120 of the canted coil spring 104 is shown located inside the single coil 110 of the helical ribbon spring 102.

The spring assembly can be in a spring ring configuration or in a spring length configuration with the free ends of the inner and outer springs not connected. As shown in FIG. 3B, the canted coil spring's height of the inner coil, or the vertical axis of the coil's two axes, is in contact with the inner or inside surface 170 of the coil 110 of helical ribbon spring 102 at a first inner contact point 172 and at a second inner contact point 174 while the canted coil spring's width, or minor axis, is spaced from the inside surface 170 of the coil 110 of the helical ribbon spring 102.

Thus, a spring assembly having an inner spring located inside an outer spring can have a cross-sectional profile shown in FIG. 3A or FIG. 3B, where an inner coil contacts the interior of the outer coil along the inner coil's length or width.

The inner spring or canted coil spring 104, which can have a generally constant force over a range of deflection as previously discussed, may provide additional force for the overall spring assembly 100 and the spring assembly offers more total spring force than a single spring, such as a single ribbon spring, could provide. The inner spring 104 located inside the outer spring 102, such as an inner canted coil spring, may also provide support for the outer spring 102, such as an outer ribbon spring, to prevent deformation of the outer spring at higher deflection amounts than where the coils of the outer spring alone, such as where the single ribbon spring alone, could permanently deform.

The coils of the inner canted coil spring 104 can therefore support the compression or load experienced by the coils of the outer helical ribbon spring 102 and not just introduce a different force versus deflection response characteristic.

Additionally, because the width of each coil of the helical ribbon spring 102 is relatively wider or larger than the width of each coil of a typical canted coil spring, typically made from a metal wire, the ribbon spring may provide a larger surface contact for loading onto a surface, such as the surface of a seal element, to more evenly energize a seal lip of the seal element. As a comparison, in certain cases where a canted coil spring alone is used, the coils of the canted coil spring could embed or dig into the seal material or create large gaps between where the coils of the canted coil spring contact the seal element.

By utilizing a spring assembly of the present disclosure, the larger surface areas of the coils of the ribbon spring can more evenly energize the inner flange and the outer flange of the seal element while the canted coil spring can more evenly bias the inner and outer flanges of the seal element with its more generally constant force versus deflection characteristic.

Figures 4A, 4B:
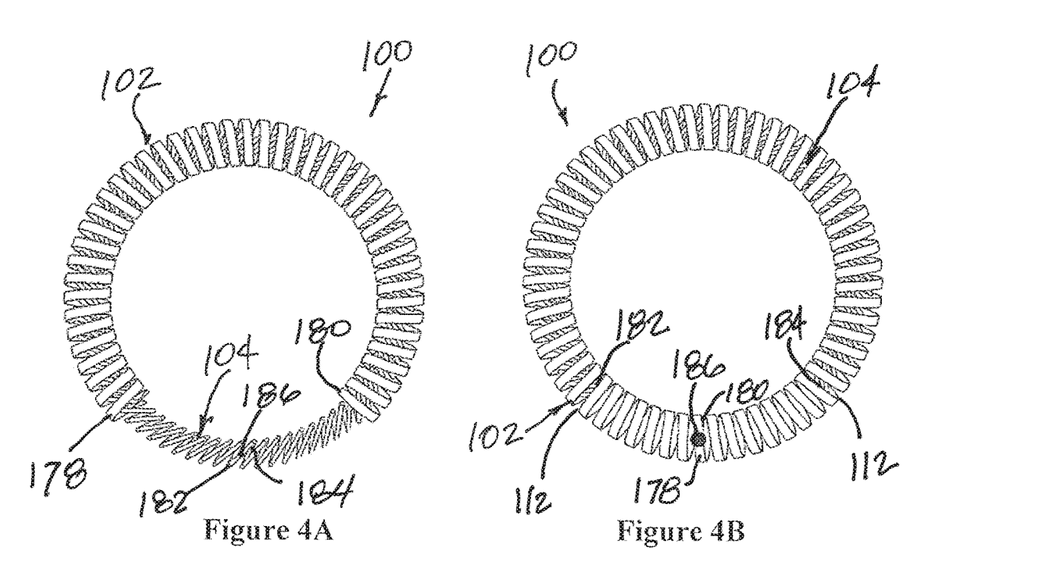
FIG. 4A shows a spring assembly wherein the inner canted coil spring has two ends that are connected, such as in a ring or garter configuration, and is longer than the length of the outer helical ribbon spring, which has two ends that are not connected.
FIG. 4B shows a spring assembly wherein the outer helical ribbon spring is longer than the inner canted coil spring, and the ends of the helical ribbon spring are mated together.

FIG. 4A shows a spring assembly 100 in which the helical ribbon spring or the outer spring 102 has two free ends 178, 180, that are not connected, and the canted coil spring 104 has two ends 182, 184 that are connected, such as by welding with a weld bead 186 shown schematically as a black dot. The two ends 182, 184 of the canted coil spring 104 are connected and in a spring ring configuration. The inner spring or the canted coil spring 104 is longer than the outer spring 102, which can be a ribbon spring, in that the ends of the canted coil spring 104 are mated or connected together, such as welded together, while the primary spring 102 has ends 178, 180 that are spaced from one another and the length of the primary spring is constrained in a similar shape by the inner canted coil spring 104.

FIG. 4B shows a spring assembly 100 wherein the outer spring 102, which can be a helical ribbon spring, is longer than the inner spring 104, which can be a canted coil spring, located in the interior space of the outer spring and the ends 178, 180 of the helical ribbon spring 104 are mated together, such as by welding 186, while the ends 182, 184 of the inner spring, as can be seen through the gaps 112, are not mated together. Since the ends of the primary spring are mated together and the ends of the inside spring are not mated together, the secondary spring, being shorter in length, is constrained in a similar round shape as the outer spring.

Figure 5A:
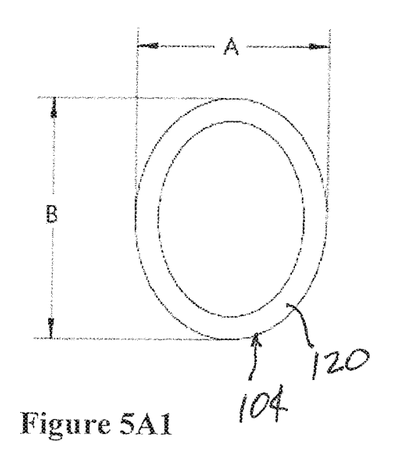
Figure 5A:
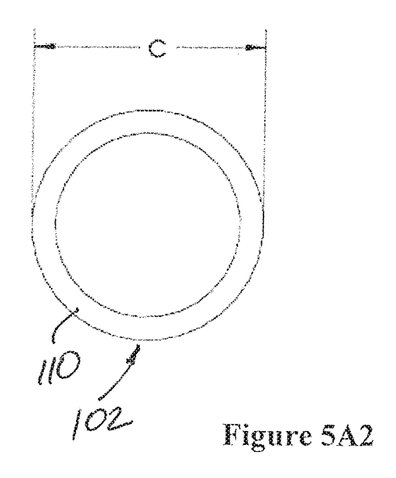
Figure 5B:
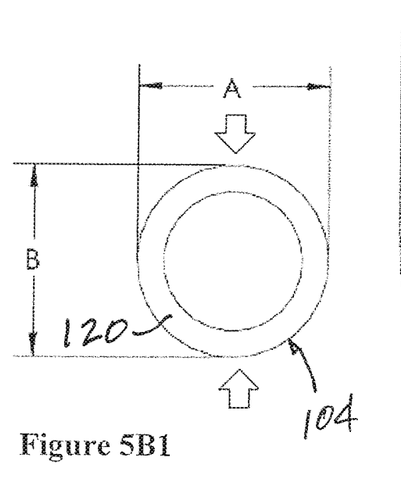
Figure 5B:
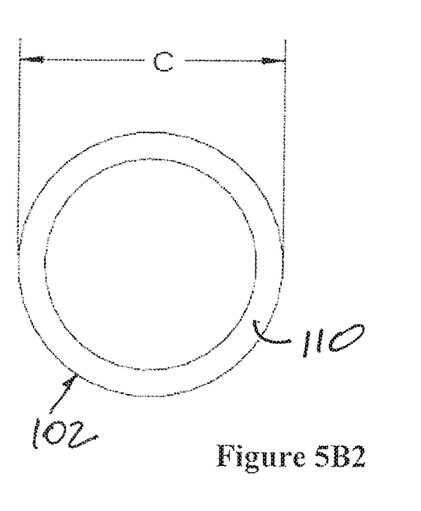

FIG. 5A1 shows a cross-sectional view of a canted coil spring 104 and FIG. 5A2 shows a cross-sectional view of a helical ribbon spring 102, each spring with a plurality of coils 110, 120 with only a single coil of each spring shown. The springs of FIGS. 5A1 and 5A2 can be in a spring ring configuration or in a spring length configuration with two free ends that are not connected. Generally when two spring lengths are assembled to form a spring assembly in accordance with aspects of the present invention, the canted coil spring 104 is located inside the helical ribbon spring 102. However, to better understanding the present spring assembly in which two or more springs are incorporated as a single spring assembly, one inside another, a description will be given with the spring lengths separated.

Dimensions "A" and "B" for the coil 120 of FIG. 5A1 and dimension "C" for the coil 110 of FIG. 5A2 are understood as representative dimensions. Dimensions "A" and "B" illustrate a width and a height, respectively, of a coil 120 of a canted coil spring 104 whereas dimension "C" illustrates a diameter of a coil 110 of a helical ribbon spring 102, which can be considered a circle. In the figures, the value of "A" is smaller than the value of "C", however the value of "B" is larger than the value of "C", or B>C>A. Thus, the coil 120 of the canted coil spring 104 should not be able to fit inside the coils 110 of the helical ribbon spring 102 due to dimension B being greater than dimension C.

FIG. 5B1 and FIG. 5B2 show similar coils as FIGS. 5A1 and 5A2 but with different relative dimensions "A", "B", and "C". Further, the coil 120 of FIG. 5B1 includes arrows to represent the compression direction of the coil 120 of the canted coil spring 104 when forces are applied to the coil 120, which causes the coil to cant, which is understood to be a reaction of a typical canted coil spring. In a spring ring or a spring length, a plurality of coils are understood to undergo the same reaction as the coil shown in FIG. 5B1. For example, when a compression force is applied to each of a plurality of coils 120 of FIG. 5A1, the coils will cant in the same preselected turning direction and will take on a relatively smaller profile as shown in FIG. 5B1. In other words, coils of a canted coil spring can have a first profile along an end view prior to being compressed by a compressive force, as shown in FIG. 5A1, and can take on a second profile along an end view after being canted by a compressive force and wherein when the coils are canted, the coils are smaller along at least one dimension, either the length dimension or the width dimension, as shown in FIG. 5B1, than before the canting by the compressive force.

In an example, each coil of a spring ring or a spring length can have a cross-sectional profile and the spring ring or the spring length, which can comprise a plurality of interconnected coils, can have a cross-sectional profile. The cross-sectional profile of the spring length or spring ring can take on the cross-sectional profile of the individual coils. The spring length or spring ring can have coils, such as ribbon coils, canted coils, or complex coils as described elsewhere herein.

Consequently, the canting of the coils, as shown in FIG. 5B1 compared to the same view shown in FIG. 5A1, reduces the overall size of dimension "B", which is now smaller than "C", or C>A and C>B. This same concept can be understood by taking an elliptical object and while viewing the object along the center axis of the elliptical object, tilting it in the direction of the axis away from the viewer and observing the overall profile of the elliptical object decreasing. The smaller profile along dimension "B" allows the coils 120 of the canted coil spring to fit inside the coils 110 of the outer helical ribbon spring 102, as shown in FIGS. 5A2 and 5B2, and for a spring assembly having inner and outer spring rings, similar to the spring assembly of FIGS. 1A and 1B, to be formed.

Figure 6A:
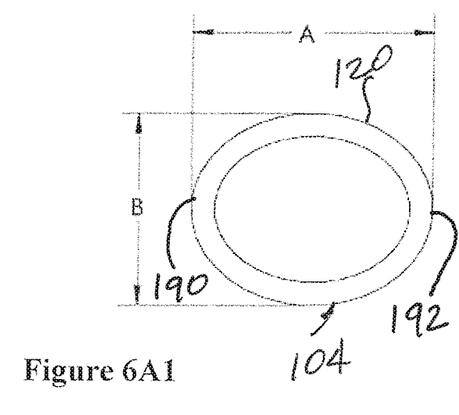
Figure 6A:
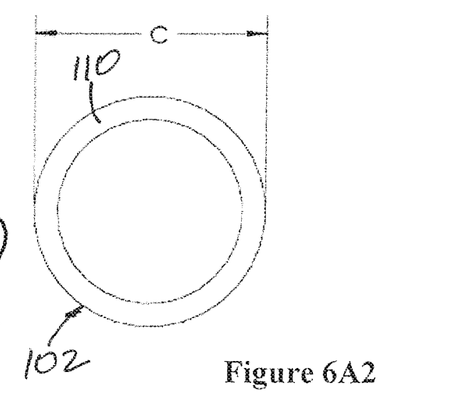

FIG. 6A1 shows a cross-sectional view or side view of a canted coil spring 104 and FIG. 6A2 shows a cross-sectional view or side view of a helical ribbon spring 102, each spring with a plurality of coils 110, 120 with only a single coil of each spring shown. The two springs of FIGS. 6A1 and 6A2 can be in a spring ring configuration or in a spring length configuration with two free ends that are not connected. Dimensions "A" and "B" for the coil 120 of FIG. 6A1 and dimension "C" for the coil 110 of FIG. 6A2 are understood as representative dimensions. Dimensions "A" and "B" illustrate the width and height, respectively, of the coil 120 of the canted coil spring 104 whereas dimension "C" illustrates the diameter of the coil 110 of the helical ribbon spring 102. In this illustration, the value of "A" is larger than the value of "C", however the value of "B" is smaller than the value of "C". Thus, the coil 120 of the canted coil spring 104 should not be able to fit inside the coil 110 of the helical ribbon spring 102.

Although not shown, if a compression force is applied to the coil of FIG. 6A1 along the same direction as dimension "A", such as to the two end points 190, 192 at the width of the coil 120, the coil 120 will cant in the same canting direction as the applied compressive force, which is understood to be a reaction of a typical canted coil spring. Consequently, the canting of the coils will decrease dimension "A" for each of the coils 120 of the canted coil spring 104. The smaller profile along dimension "A" for the coils 120 of FIG. 6A1 allows the coils 120 of the canted coil spring 104 of FIG. 6A1 to fit inside the coils 110 of the outer helical ribbon spring 102 of FIG. 6A2, and for a spring assembly having inner and outer spring rings, similar to the spring assembly of FIGS. 1A and 1B, to be formed.

FIGS. 7A1, 7A2, 7B1, and 7B2 show cross-sectional views of both a canted coil spring 104 and a helical ribbon spring 102 with each spring comprising a plurality of coils 110, 120 with only one coil of each spring shown. The springs 102, 104 can be in a spring ring configuration or in a spring length configuration with two free ends that are not connected. Generally in a spring assembly with an outer spring and an inner spring, the canted coil spring 104 is located inside the helical ribbon spring 102 when assembling the two in accordance with aspects of the present invention. However, in order to more clearly describe the present embodiment, a description will be given with the springs separated.

Dimensions "A", "B", "C", "D" and "E" are understood as representative dimensions. Dimensions "A" and "B" illustrate the width and the height, respectively, of each coil 120 of a canted coil spring 104. Dimension "C" illustrates the diameter of each coil 110 of a helical ribbon spring 102. FIG. 7B2 is shown with two arrows representing the compression direction of the coil 110 of the helical ribbon spring 102. The coil 110 of FIG. 7B2 shows how the circular shape coil 110 of FIG. 7A2 would appear when compressed. The altered shape shown in FIG. 7B2 when under a compressive force, compared to that of FIG. 7A2, is now elliptical and has a new representative dimensions "D" and "E", from prior dimensions "C" and "C".

Figure 7A:
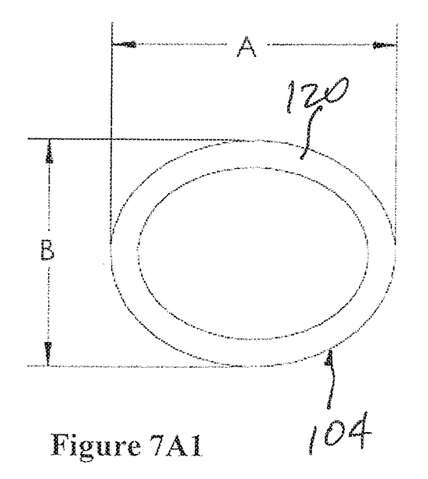
Figure 7A:
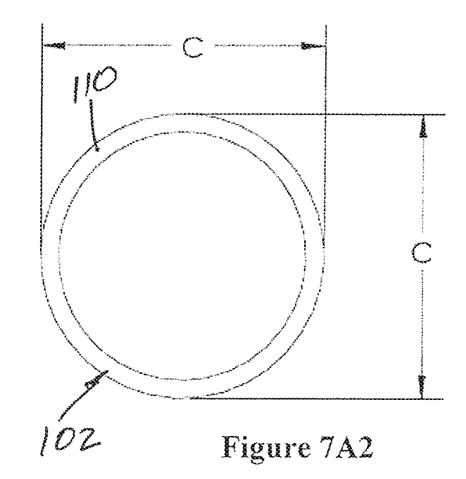
Figure 7B:
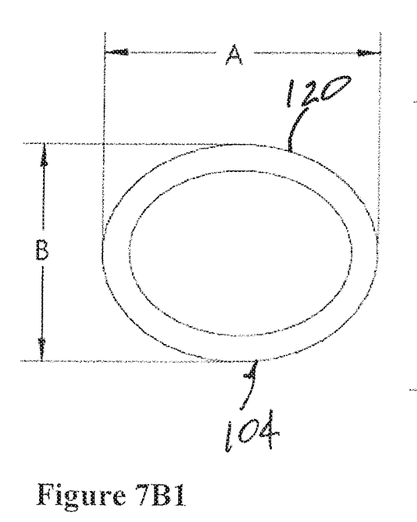
Figure 7B:
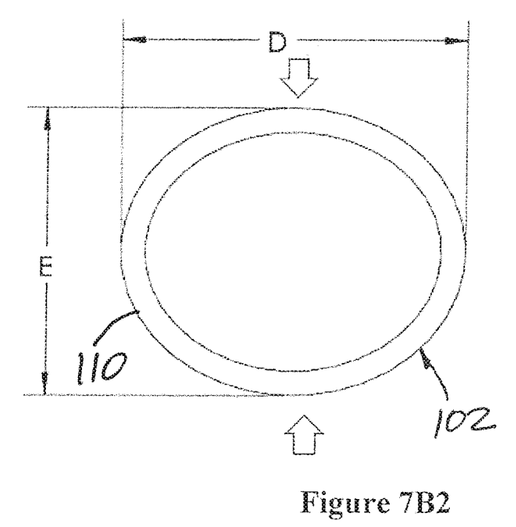

Between the illustrations of FIGS. 7A1 and 7A2 and FIGS. 7B1 and 7B2, dimension "B" is smaller than dimension "C". However dimension "A" is larger than dimension "C". Thus, the coil 120 of the canted coil spring 104 of FIG. 7A1 is not able to fit inside the coil 110 of the helical ribbon spring of FIG. 7A2. However, when the same two coils are considered with the coil 110 of the helical ribbon spring undergoing a compression force, as shown in FIG. 7B2, the overall size of dimension "C" is reduced due to the distortion caused by the compressive force, creating two new dimensions "D" and "E". As shown in FIGS. 7B1 and 7B2, dimension "D" is larger than dimension "A" and dimension "E" is larger than dimension "B". This relative dimensions will allow the coils 120 of the canted coil spring 104 to fit inside coils 110 of the helical ribbon spring 102 and for a spring assembly having inner and outer springs to be formed.

Figure 8:
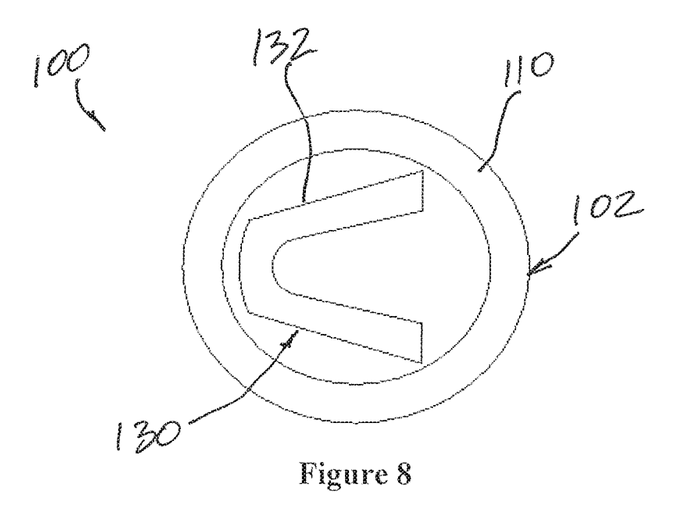
FIG. 8 shows a cross-sectional view of a spring assembly with a cantilever spring or V-spring located inside an outer helical ribbon spring, or a side view of a V-segment of a V-spring and a coil of a helical ribbon spring.

FIG. 8 shows a cross-sectional view of a section of a spring assembly 100 comprising an inner spring 130 located inside an outer spring 102. As shown, the inner spring 130 can be a cantilever spring 130 located inside a helical ribbon spring 102. The cantilever spring or V-spring 130 comprises a plurality of V-segments or V-bodies 132 and the helical ribbon spring 102 comprises a plurality of coils 110 with only a single segment 132 and single coil 110 of each spring shown. Each V-segment can have two legs forming a V-shape body.

A closed looped V-spring can be formed by connecting two ends of a spring body comprising a plurality of interconnected V-bodies or segments each with two legs together. In an example, the two legs of each V-body can have similar sizes and the V-body is generally symmetrical through the apex of the V-body. In an alternative embodiment, each of the V-bodies can comprise two legs of unequal lengths, which can include a long leg and a short leg joined to one another by a connecting end or a connecting portion at the apex of the V-body.

The springs 102, 130 can be in a spring ring configuration or in a spring length configuration with two free ends that are not connected. Generally when assembled to form a spring assembly in accordance with aspects of the present invention, the cantilever spring 130 is located inside the coils 110 of the helical ribbon spring 102. This spring assembly 100 embodiment with an outer spring and an inner spring, in a spring ring or a spring length configuration, shows that a secondary spring or inner spring in accordance with aspects of the present invention is not limited or restricted to just a canted coil spring but can include or have other spring types.

Figure 9:
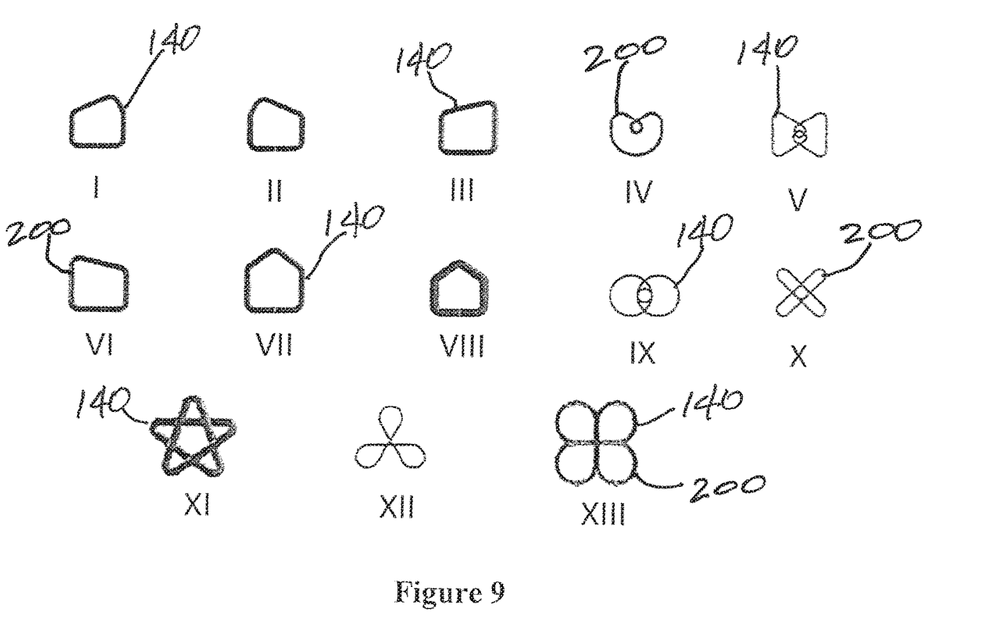
FIGS. 9 (I-XIII) show side views of a variety of coil shapes of coils of canted coil springs that are usable with helical ribbon springs.

FIGS. 9(I-XIII) show cross-sectional views of different canted coil springs 200 with unique coil shapes 140 with the plurality of coils 140 of the springs 200 being interconnected and wherein each coil 140 can embody a unique coil shape that is other than round or elliptical. Each of the canted coil springs of FIGS. 9(I-XIII) can operate as a secondary spring or inner spring and can be located inside the coils of an outer primary spring to form a spring assembly having inner and outer springs in accordance with aspects of the present invention. The outer primary spring can be a helical ribbon spring. The various springs 200 with unique coils 140 are further described in U.S. Pub. No. 2017/0025779. The springs 200 represented by FIGS. 9(I-XIII) show that a secondary spring or inner spring in accordance with aspects of the present invention for use in a spring assembly having inner and outer springs is not limited or restricted to just a canted coil spring but can include or have other spring types and coil shapes.

Figure 10:
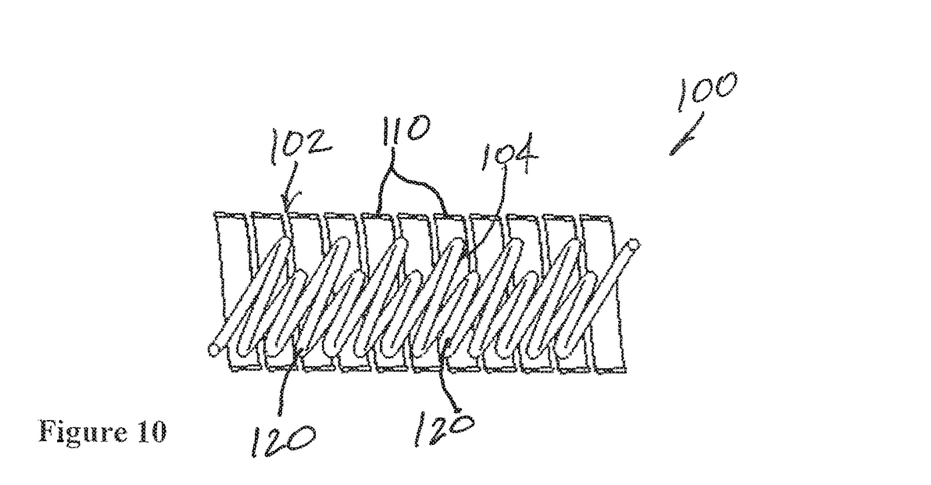
FIG. 10 shows a cross-sectional side view of an outer helical ribbon spring and a side view of a canted coil spring located inside the helical ribbon spring. The canted coil spring has coils of different or alternating coil sizes.

FIG. 10 shows a side view of a spring assembly 100 comprising a canted coil spring 104 located inside a helical ribbon spring 102, shown along a side cross-section. The helical ribbon spring 102 is shown in a cross-sectional view to demonstrate the canted coil spring 104 being located inside the coils 110 of the helical ribbon spring 102. Furthermore, the canted coil spring 104 is shown in a non-standard pattern wherein the coils 120 of the canted coil spring 104 alternate in coil size. The alternating pattern can vary, such as one to one small to large, two small coils then one large coil, two large coils then one small coil, two small coils then two large coils, etc. Further discussions of a canted coil spring having alternating coils are disclosed in U.S. Pat. No. 9,518,626. The cross-sectional view of the helical ribbon spring 102 illustrates that the size of each coil 110 of the helical ribbon spring is larger than the coils 120 of the canted coil spring 104. Furthermore, FIG. 10 shows a spring assembly wherein each of said two springs is in a spring length configuration. However, the spring assembly of FIG. 10 can be practiced as a spring ring. Still further, while the inner canted coil spring 104 is shown with alternating coils 120, any of the various canted coil springs described elsewhere herein can be used with the outer helical ribbon spring 102.

Figure 11:
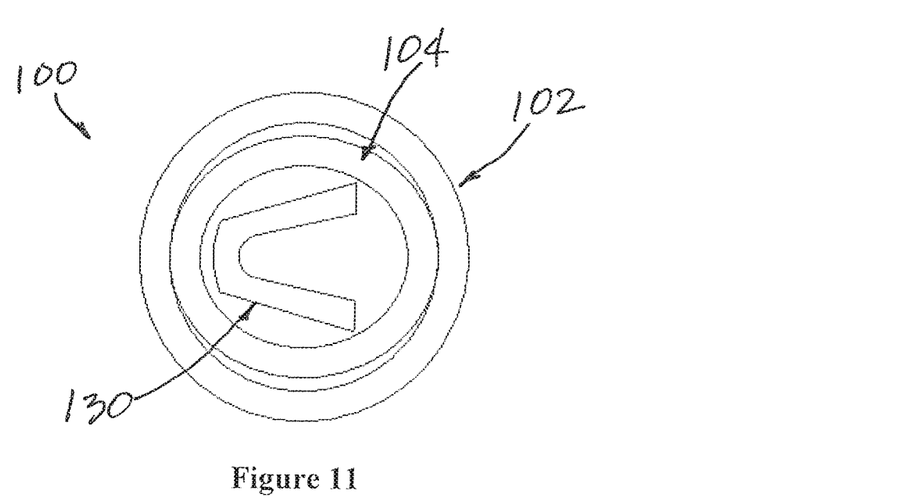
FIG. 11 shows a cross-sectional view, or a side view, of a spring assembly with more than one spring, such as multiple springs, inside an outer helical ribbon spring.

FIG. 11 shows a cross-sectional end view of a section of a spring assembly 100 comprising a cantilever spring or V-spring 130 located inside a canted coil spring 104, which is located inside a helical ribbon spring 102. The canted coil spring 104 can be referred to as a first inner spring and the V-spring 130 can be referred to as a second inner spring. The springs 102, 104, 130 of the spring assembly 100 can be in a spring ring configuration with free ends of each spring of all three springs joined or connected or in a spring length configuration with free ends of each of the springs 102, 104, 130 not connected. In some examples, only two free ends of one of the springs 102, 104, 130, or two free ends of two of the springs 102, 104, 130 are connected to maintain the spring assembly in a ring configuration. FIG. 11 represents a spring assembly in accordance with aspects of the present invention in which a secondary spring is not restricted to a single secondary spring, but may have more than one springs, for example a canted coil spring and a V-spring. The V-spring can be similar to the V-spring described above with reference to FIG. 8.

Figure 12:
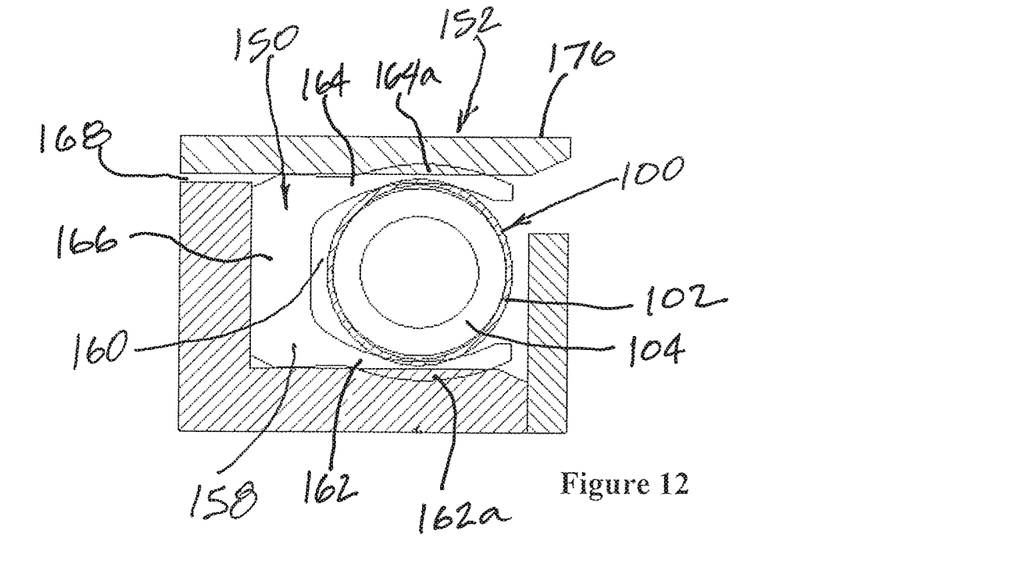
FIG. 12 shows a cross-sectional view of a seal assembly in which the seal element has a spring cavity with a spring assembly located therein and wherein the spring assembly comprises a canted coil spring located inside an outer helical ribbon spring.

FIG. 12 shows a cross-sectional view of a seal assembly 150 located in a gland or seal housing 152. The seal assembly 150 comprises a seal element 158 having a spring cavity 160 defined by an inside flange 162 having a sealing lip 162a, an outside flange 164 having a sealing lip 164a, and a center channel section 166 located between the inside and outside flanges. The spring cavity 160 having a spring assembly 100 located therein. The spring assembly 100 energizes the inner and outer sealing lips 162a, 164a away from one another to seal against the surfaces of the gland 152. The spring assembly 100 can have a primary spring or outer spring 102 and one or more secondary springs 104 located inside the primary spring, such as one of the spring assemblies discussed elsewhere herein. As shown, the spring assembly 100 comprises a canted coil spring 104 located inside a helical ribbon spring 102. The canted coil spring provides additional support to the helical ribbon spring as the seal is compressed onto the helical ribbon spring.

The spring seal assembly 150 of FIG. 12 is configured to seal the gap 168 in the housing from leakage. Shown schematically, the seal assembly 150 of FIG. 12 can alternatively be viewed as providing a seal against a moving or rotating shaft 176 and the flange with element number 164 can be considered the inside flange defining an inside diameter for receiving the shaft 176 and the sealing lip sealing against the dynamic surface of the shaft.

In other examples, spring assemblies disclosed herein can have an outer spring or primary spring 102, which preferably is a ribbon spring having a plurality of interconnected ribbon coils, and an inner or secondary biasing member 104, and wherein the inner biasing member is made from an elastomeric O-ring or an elastomer-filled component. The inner O-ring or elastomer-filled component can provide added biasing force against the interior surfaces of the coils of the outer spring.

Methods of making and of using spring assemblies, applications of spring assemblies, and components thereof are within the scope of the present invention.

Although limited embodiments of spring assemblies, applications of spring assembly and their components have been specifically described and illustrated herein, many modifications and variations will be apparent to those skilled in the art. Accordingly, it is to be understood that the spring assemblies and their components constructed according to principles of the disclosed devices, systems, and methods may be embodied other than as specifically described herein. The disclosure is also defined in the following claims.

What is claimed is:

1. A spring assembly comprising:
an inner spring located inside an outer spring, a helical ribbon spring as the outer spring, said outer spring comprising a plurality of interconnected coils;
wherein said outer spring comprises an outer cross-sectional profile;
wherein said inner spring comprises an inner cross-sectional profile;
wherein said inner cross-sectional profile is located within said outer cross-sectional profile and biased against interior surfaces of the plurality of interconnected coils; and
wherein (1) the outer spring have two ends that are joined to form a spring ring, (2) the inner spring have two ends that are joined to form a spring ring, or (3) the outer spring have two ends that are joined to form a spring ring and the inner spring have two ends that are joined to form a spring ring.

2. The spring assembly according to claim 1, wherein said outer spring comprises a length and said inner spring comprises a length and wherein said length of said inner spring is equal to or less than said length of said outer spring.

3. The spring assembly according to claim 1, wherein said outer spring comprises a length and said inner spring comprises a length and wherein said length of said outer spring is equal to or less than said length of said inner spring.

4. The spring assembly according to claim 1, wherein said inner spring is a canted coil spring comprising a plurality of interconnected coils all canted in a same direction, and wherein each of the plurality of interconnected coils of the inner spring comprises a cross-sectional profile comprising a cross-sectional height dimension and a cross-sectional width dimension.

5. The spring assembly according to claim 4, wherein each of said plurality of interconnected coils of said outer spring comprises a cross-sectional height dimension, and wherein said cross-sectional height dimension of said inner spring is larger than said cross-sectional height dimension of said outer spring.

6. The spring assembly according to claim 4, wherein each of said plurality of interconnected coils of said outer spring comprises a cross-sectional width dimension and wherein said cross-sectional width dimension of said inner spring is larger than said cross-sectional width dimension of said outer spring.

7. The spring assembly according to claim 4, wherein said inner cross-sectional profile of said inner spring is smaller than said outer cross-sectional profile of said outer spring.

8. The spring assembly according to claim 4, wherein said inner cross-sectional profile of said inner spring is deflectable so that the cross-sectional height dimension or the cross-sectional width dimension of said inner spring reduces in dimension.

9. The spring assembly according to claim 4, wherein each of the plurality of interconnected coils of the outer spring comprises a cross-sectional profile comprising a cross-sectional height dimension and a cross-sectional width dimension and wherein the cross-sectional width dimension is smaller than the cross-sectional width dimension of each of the plurality of coils of the inner spring prior to being compressed and larger than the cross-sectional width dimension of each of the plurality of coils of the inner spring after being compressed.

10. The spring assembly according to claim 4, wherein each of the plurality of interconnected coils of the outer spring comprises a cross-sectional profile comprising a cross-sectional height dimension and a cross-sectional width dimension and wherein the cross-sectional height dimension is smaller than the cross-sectional height dimension of each of the plurality of coils of the inner spring prior to being compressed and larger than the cross-sectional height dimension of each of the plurality of coils of the inner spring after being compressed.

11. The spring assembly according to claim 1, wherein said outer spring is made of a material different from a material used to form said inner spring.

12. The spring assembly according to claim 1, wherein said inner spring is a cantilever spring or a canted coil spring with a complex coil shape.

13. The spring assembly according to claim 1, wherein said outer cross-sectional profile is an oval shape, a rectangular shape, a square shape, or a triangular shape.

14. The spring assembly of claim 1, wherein the inner spring is a first inner spring and further comprising a second inner spring having a second inner spring cross-sectional profile, and wherein the second inner spring cross-sectional profile is located within said inner cross-sectional profile of said first inner spring.

15. The spring assembly of claim 1, further comprising a seal element comprising an inside flange, and outside flange, a center channel section located between the inside flange and the outside flange, which together define a spring cavity, and wherein the outer spring, with the inner spring located therein, is located in the spring cavity and biasing the inner flange and the outer flange away from one another.

16. A spring assembly comprising:
an inner spring located inside an outer spring;
a helical ribbon spring as the outer spring, said outer spring comprising a plurality of interconnected coils;
wherein said outer spring comprises an outer cross-sectional profile;
wherein said inner spring comprises an inner cross-sectional profile;
wherein said inner cross-sectional profile is located within said outer cross-sectional profile; and
wherein the outer spring has two spaced apart ends and the inner spring has two spaced apart ends.

17. The spring assembly of claim 16, further comprising a third spring having a third spring cross-sectional profile, and wherein the third spring cross-sectional profile is located within said inner cross-sectional profile.

18. A method of using a spring assembly comprising:
obtaining a spring comprising inner spring located inside an outer spring, said outer spring being a ribbon spring comprising plurality of interconnected coils;
wherein said outer spring comprises an outer cross-sectional profile;
wherein said inner spring comprises an inner cross-sectional profile;
wherein said inner cross-sectional profile is located within said outer cross-sectional profile and biased against interior surfaces of the plurality of interconnected coils; and
wherein (1) the outer spring have two ends that are joined to form a spring ring, (2) the inner spring have two ends that are joined to form a spring ring, or (3) the outer spring have two ends that are joined to form a spring ring and the inner spring have two ends that are joined to form a spring ring; and
placing the spring into or onto a component.

19. The method of claim 18, wherein the component is a seal element comprising an inside flange, an outside flange, and a center channel section located between the inside flange and the outside flange.

20. The method according to claim 18, wherein said inner spring is a cantilever spring or a canted coil spring.

* * * * *

UNITED STATES PATENT AND TRADEMARK OFFICE
CERTIFICATE OF CORRECTION

PATENT NO. : 11,353,079 B2
APPLICATION NO. : 16/150117
DATED : June 7, 2022
INVENTOR(S) : Patrick Whitford et al.

It is certified that error appears in the above-identified patent and that said Letters Patent is hereby corrected as shown below:

In the Claims

In Column 14, Line 62, in Claim 1, delete "have" and insert -- has --, therefor.

In Column 14, Line 63, in Claim 1, delete "have" and insert -- has --, therefor.

In Column 14, Line 65, in Claim 1, delete "have" and insert -- has --, therefor.

In Column 14, Line 66, in Claim 1, delete "have" and insert -- has --, therefor.

In Column 16, Line 47, in Claim 18, delete "have" and insert -- has --, therefor.

In Column 16, Line 48, in Claim 18, delete "have" and insert -- has --, therefor.

In Column 16, Line 50, in Claim 18, delete "have" and insert -- has --, therefor.

In Column 16, Line 51, in Claim 18, delete "have" and insert -- has --, therefor.

Signed and Sealed this
Twenty-fifth Day of October, 2022

Katherine Kelly Vidal
*Director of the United States Patent and Trademark Office*